US009866522B2

(12) United States Patent
Chatterjee et al.

(10) Patent No.: US 9,866,522 B2
(45) Date of Patent: *Jan. 9, 2018

(54) METHOD TO CONTROL DYNAMIC HOST CONFIGURATION PROTOCOL POOL EXHAUSTION IN DYNAMIC NETWORK ENVIRONMENTS

(71) Applicant: Aruba Networks, Inc., Sunnyvale, CA (US)

(72) Inventors: Avignan Chatterjee, Bangalore (IN); Rajesh Kumar Ganapathy Achari, Bangalore (IN); Srinivasan Jayarajan, Bangalore (IN); Harsha Nagaraja, Bangalore (IN); Anoop Kumaran Nair, Bangalore (IN); Venkatesh Ramachandran, Bangalore (IN); Isaac Theogaraj, Bangalore (IN); Venkatraju Venkatanaranappa, Bangalore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 14/445,312

(22) Filed: Jul. 29, 2014

(65) Prior Publication Data
US 2016/0036770 A1   Feb. 4, 2016

(51) Int. Cl.
*G06F 15/16* (2006.01)
*H04L 29/12* (2006.01)
(Continued)

(52) U.S. Cl.
CPC .......... *H04L 61/2015* (2013.01); *H04L 41/12* (2013.01); *H04L 61/2053* (2013.01); *H04L 61/2061* (2013.01); *H04L 67/42* (2013.01)

(58) Field of Classification Search
CPC ...... H04L 61/2015; H04L 41/12; H04L 67/42
See application file for complete search history.

(56) References Cited

U.S. PATENT DOCUMENTS 6,640,244 B1 * 10/2003 Bowman-Amuah ... G06F 9/466
  707/999.01
6,768,743 B1 *  7/2004 Borella ............. H04L 29/12358
  370/401
(Continued)

*Primary Examiner* — Razu A Miah
(74) *Attorney, Agent, or Firm* — Hewlett Packard Enterprise Patent Department

(57) ABSTRACT

The present disclosure discloses a method and a network device for controlling DHCP pool exhaustion in dynamic network environments. Specifically, a network device determines that a client device is assigned an Internet Protocol (IP) address by a DHCP server. The network device detects that the client device is disconnected from a network associated with the IP address, for example, by receiving a de-association message from the client device; determining that a session or an entry corresponding to the client device has timed out; determining that the client device has failed to respond to one or more messages transmitted to the client device; determining that the client device has connected to another network different than said network; etc. In response, the network device then generates a DHCP release message on behalf of the client device, and transmits the DHCP release message to the DHCP server.

19 Claims, 5 Drawing Sheets

(51) Int. Cl.
*H04L 12/24* (2006.01)
*H04L 29/06* (2006.01)

(56) References Cited

U.S. PATENT DOCUMENTS

| | | | | |
|---|---|---|---|---|
| 2003/0225893 | A1* | 12/2003 | Roese | G01S 5/02 709/227 |
| 2006/0002407 | A1* | 1/2006 | Sakamoto | H04L 12/462 370/402 |
| 2007/0022469 | A1* | 1/2007 | Cooper | H04K 1/00 726/3 |
| 2009/0193103 | A1* | 7/2009 | Small | H04L 12/462 709/221 |
| 2010/0106791 | A1* | 4/2010 | Dai | H04L 12/465 709/206 |
| 2010/0191839 | A1* | 7/2010 | Gandhewar | H04L 29/12028 709/220 |
| 2011/0170554 | A1* | 7/2011 | De Smedt | H04L 12/5692 370/401 |
| 2012/0144033 | A1* | 6/2012 | Daude | H04L 29/12009 709/224 |

* cited by examiner

METHOD TO CONTROL DYNAMIC HOST CONFIGURATION PROTOCOL POOL EXHAUSTION IN DYNAMIC NETWORK ENVIRONMENTS

FIELD

Embodiments of the present disclosure relate to virtual local area network managements. In particular, embodiments of the present disclosure describe a method and network device for controlling dynamic host configuration protocol (DHCP) pool exhaustion in dynamic network environments.

BACKGROUND

In computer networking, a single layer-2 network may be partitioned to create multiple distinct broadcast domains, which are mutually isolated so that packets can only pass between them via one or more routers. Such a domain is generally referred to as a virtual local area network (VLAN). This is usually achieved on switching or routing network devices. Some devices may support VLAN by partitioning on a port level; other devices can mark packets through tagging so that a single interconnect (trunk port) may be used to transport data for various VLANs. A VLAN has the same attributes as a physical local area network (LAN), but it allows for client devices to be grouped together more easily even if they are connected to the same network switch. VLAN membership can be configured through software. Unlike physically separate networks, VLANs share bandwidth, so VLAN trunks may require aggregated links and/or quality of service prioritization.

The Dynamic Host Configuration Protocol (DHCP) generally refers to a standardized networking protocol used on Internet Protocol (IP) networks for dynamically distributing network configuration parameters, such as IP addresses for interfaces and services. With DHCP, client devices of a network request IP addresses and networking parameters automatically from a DHCP server, reducing the need for a network administrator or a user to configure these settings manually.

In a wireless local area network (WLAN), when a client device belonging to a particular VLAN requests an IP address, a network control device will forward the request to the DHCP server corresponding to the particular VLAN. The DHCP server will then assign an IP address to lease to the client device. Specifically, the DHCP server can maintain an address pool for the particular VLAN. Upon receiving the DHCP request, the DHCP server assigns an available IP address in the address pool for the particular VLAN to the client device with a predetermined period of time, and marks the assigned IP address as unavailable. If the client device fails to renew the IP address, the DHCP server will release the assigned IP address as an available IP address to the address pool for the particular VLAN. The client device may fail to renew the IP address, for example, after the client device disconnects with the WLAN. In such scenarios, the IP address will be reserved for the predetermined period of time until the lease period expires. The DHCP server will then reuse the IP address by including the IP address in the DHCP available address pool, and thus making it available for other client devices.

Many types of public facing network environments, such as, airports, super markets, hospitals, etc., usually have a visitor population that is very dynamic. For example, a significant portion of the WLAN client devices may only be connected to the network for a short time, and would probably not re-connect again for a long time. Another portion of the WLAN client devices may stay connected for a considerable time interval. Note that, even if a client device, which is previously assigned an IP address by the DHCP server, is disconnected and moves away from the WLAN, the DHCP server still cannot reuse the Internet Protocol (IP) address until the DHCP lease expires. Therefore, when a large number of client devices connect to the WLAN for a short time and then leave the WLAN, the DHCP pool exhaustion would occur rather quickly.

An existing solution is to use a short DHCP lease period to reduce the likelihood of DHCP pool exhaustion. However, a short DHCP lease period would require client devices which connect to the WLAN for longer periods continuously to renew their DHCP leases, which is inconvenient and inefficient for such client devices.

DETAILED DESCRIPTION

In the following description, several specific details are presented to provide a thorough understanding. While the context of the disclosure is directed to VLAN management in local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to virtual local area network managements. In particular, embodiments of the present disclosure describe a method and network device for controlling dynamic host configuration protocol (DHCP) pool exhaustion in dynamic network environments.

With the solution provided herein, a network device determines that a client device is assigned an Internet Protocol (IP) address by a DHCP server. The network device detects that the client device is disconnected from a network associated with the IP address. The network device can detect that the client device is disconnected from a network associated with the IP address, for example, by receiving a de-association message from the client device; determining that a session or an entry corresponding to the client device has timed out; determining that the client device has failed to respond to one or more messages transmitted to the client device; determining that the client device has connected to another network different than said network; determining that no network device in a VLAN associated with the IP address assigned to the client device detects a connection of the client device with the network; etc.

In response, the network device then generates a DHCP release message on behalf of the client device, and transmits the DHCP release message to the DHCP server. In particular, in response to determining that a DHCP lease associated with the IP address has not expired or determining that a DHCP release message has not been transmitted by the client device, the network device can generate the DHCP release message on behalf of the client device by identifying a source of the DHCP release message as the client device.

DHCP Pool Exhaustion

Figure 1:
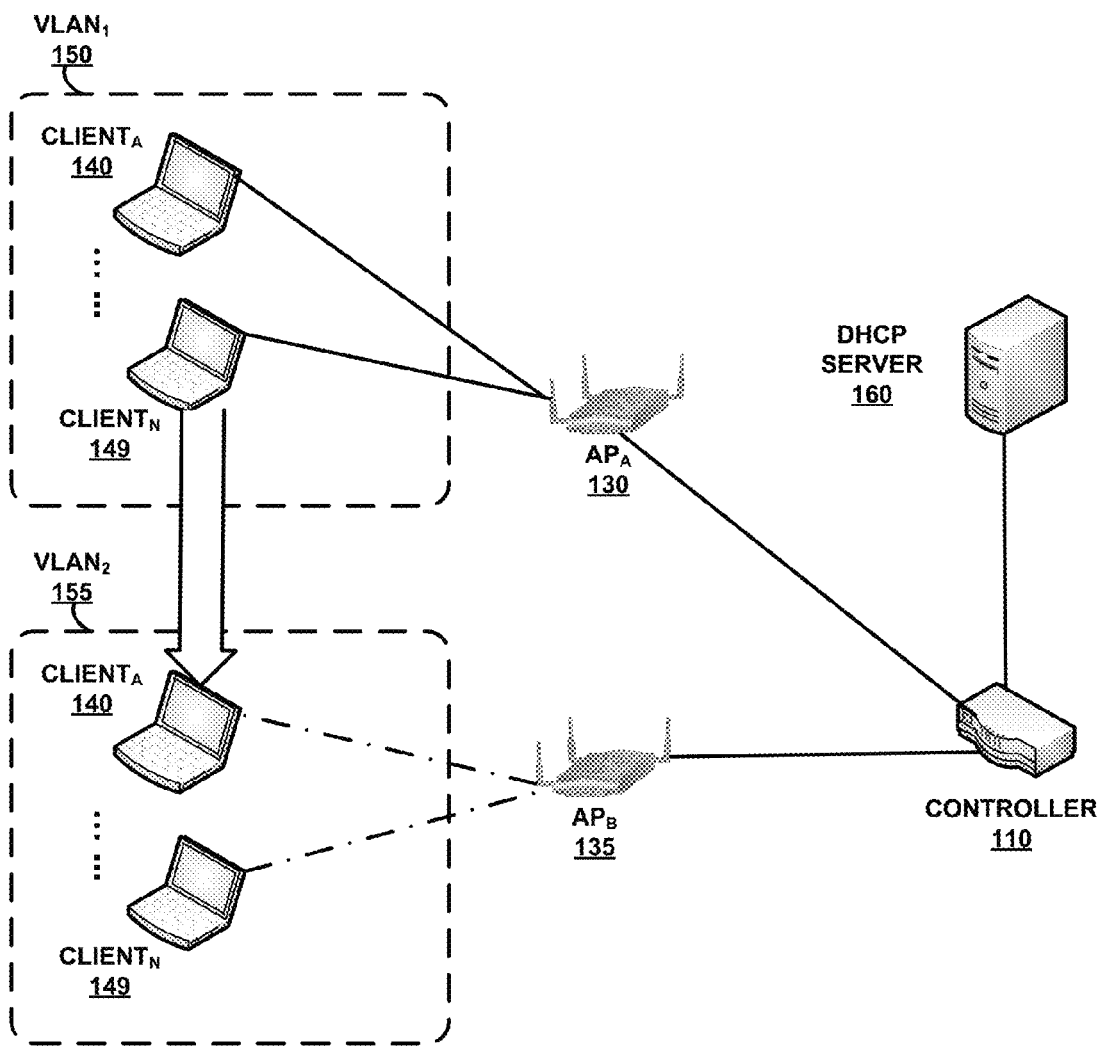
FIG. 1 shows an exemplary network environment according to embodiments of the present disclosure.

FIG. 1 shows an exemplary network environment according to embodiments of the present disclosure. Specifically, FIG. 1 illustrates a network that includes at least a DHCP server 160, a network controller 110, a number of access points (APs) (such as, $AP_A$ 130 and $AP_B$ 135), and a plurality of client devices, such as $Client_A$ 140, ..., $Client_N$ 149, etc.

In addition, wireless local area network (WLAN) illustrated in FIG. 1 is partitioned into a number of virtual local area networks (VLANs). For example, in some embodiments, client devices associated with $AP_A$ 130 are configured as members of $VLAN_1$ 150; and, client devices associated with $AP_B$ 135 are configured as members of $VLAN_2$ 155. In some embodiments, all enterprise client devices are configured as members of $VLAN_1$ 150, and all guest client devices are configured as members of $VLAN_2$ 155. In some embodiments, client devices located in a first facility building are configured as members of $VLAN_1$ 150, and client devices located in a second facility building are configured as members of $VLAN_2$ 155. Although only a few examples are mentioned, it shall be noted that the WLAN can be partitioned into any number of VLANs with any mechanism and without any limitations.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Access points, e.g., $AP_A$ 130 and $AP_B$ 135, generally refer to a set of wireless network devices that allow wireless client devices to connect to a wired network using IEEE 802.11 or related standards. The APs usually connect to a router via a wired network, but can also be an integral component of the router itself.

Each access point serves one or more client devices. Also, each client device may belong to a particular VLAN. For illustration purposes only, assuming that, in FIG. 1, a plurality of client devices, such as $Client_A$ 140, ..., $Client_N$ 149, initially associate with $AP_A$ 130. Moreover, assuming that when each of the client devices associates with $AP_A$ 130, network controller 110 assigns each client device to $VLAN_1$ 150. Therefore, when a client device, e.g., $Client_A$ 140, sends a DHCP request, $AP_A$ 130 will forward the request to DHCP server 160 based on the corresponding VLAN assignment to $Client_A$ 140.

Next, DHCP server 160 will assign an available IP address to $Client_A$ 140 upon receiving the DHCP request. The available IP address will be selected from an address pool that is reserved for $VLAN_1$ 150 and maintained by DHCP server 160.

Now, the client devices, such as $Client_A$ 140, ..., $Client_N$ 149, move from one location to a new location. As a result, all of the client devices disassociated with $AP_A$ 130, and now associate with $AP_B$ 135. In this example, network controller 110 determines that client devices belong to a new VLAN, e.g., $VLAN_2$ 155, after they are associated with $AP_B$ 135. Therefore, each client device will need to send a new DHCP request. When DHCP server 160 receives the new DHCP requests from the client devices, DHCP server 160 will assign an available IP address from an address pool that is reserved for $VLAN_2$ 155 to each client device.

Nevertheless, because DHCP server 160 typically does not release an IP address until the lease period expires, the IP addresses previously assigned to the client devices corresponding to $VLAN_1$ 150 will remain to be unavailable until the predetermined lease period is over. Prior to the lease expiry, if other client devices attempt to send a DHCP request for an IP address associated with $VLAN_1$ 150, the DHCP request may be denied due to the DHCP address pool exhaustion. To solve the DHCP pool exhaustion problem, embodiments of the present disclosure can detect that a client device is no longer active in the network, and therefore perform an artificial DHCP release, on behalf of the client device, to release the IP address previously assigned to the client device by DHCP server 160.

Inter-Controller Client Information Share

Figure 2:
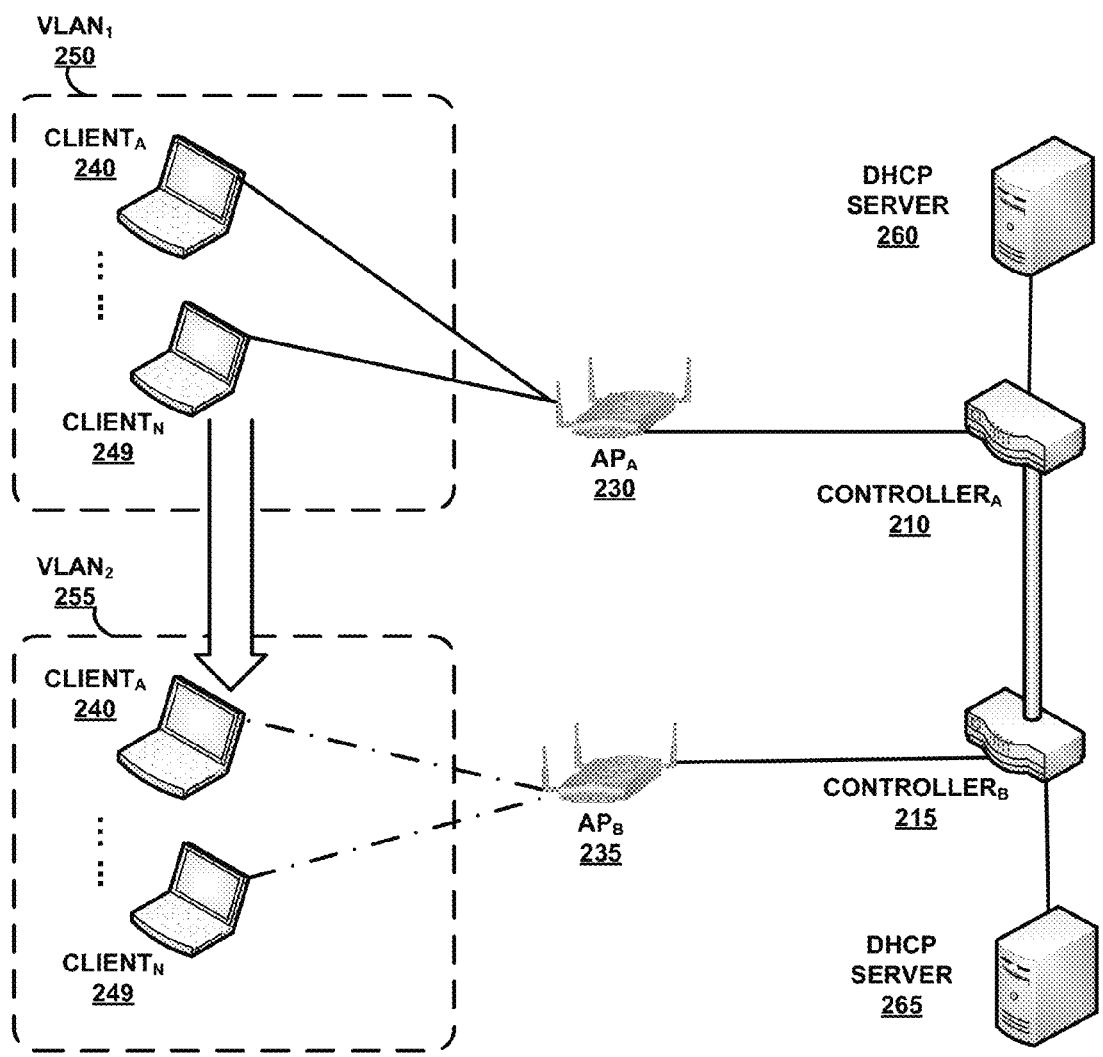
FIG. 2 shows another exemplary network environment according to embodiments of the present disclosure.

FIG. 2 shows another exemplary network environment according to embodiments of the present disclosure. Specifically, FIG. 2 illustrates a network that includes at least two DHCP servers (namely, DHCP server 260 and DHCP server 265), at least two network controllers (namely, $Controller_A$ 210 and $Controller_B$ 215), a number of access points (APs) (such as, $AP_A$ 230 and $AP_B$ 235), and a plurality of client devices, such as $Client_A$ 240, ..., $Client_N$ 249, etc. In addition, wireless local area network (WLAN) illustrated in FIG. 2 is partitioned into a number of virtual local area networks (VLANs), including but not limited to, $VLAN_1$ 250 and $VLAN_2$ 255.

Each access point serves one or more client devices. Also, each client device may belong to a particular VLAN. As illustrated in FIG. 2, a plurality of client devices, such as $Client_A$ 240, ..., $Client_N$ 249, initially associate with $AP_A$ 230 that is connected to $Controller_A$ 210. Moreover, assuming that when each of the client devices associates with $AP_A$ 230, $Controller_A$ 210 assigns each client device to $VLAN_1$ 250. Therefore, when a client device, e.g., $Client_A$ 240, sends a DHCP request, $AP_A$ 230 will forward the request to DHCP server 260 based on the corresponding VLAN assignment to $Client_A$ 240. Next, DHCP server 260 will assign an available IP address to $Client_A$ 240 upon receiving the DHCP request. The available IP address will be selected from an address pool that is reserved for $VLAN_1$ 250 and maintained by DHCP server 260.

Now, the client devices, such as $Client_A$ 240, ..., $Client_N$ 249, move from one location to a new location. As a result, all of the client devices disassociated with $AP_A$ 230, and now associate with $AP_B$ 235. In this example, a different network controller, e.g., $Controller_B$ 215, determines that client devices belong to a new VLAN, e.g., $VLAN_2$ 255, after they are associated with $AP_B$ 235. Therefore, each client device will need to send a new DHCP request in order to be assigned a new IP address corresponding to $VLAN_2$ 255. The new DHCP request will be forwarded by $Controller_B$ 215 to DHCP server 265. When DHCP server 265 receives the new DHCP requests from the client devices, DHCP server 265 will assign an available IP address from an address pool that is reserved for $VLAN_2$ 255 to each client device.

Because there are two network controllers in this example, $Controller_A$ 210 cannot initiate a DHCP release upon detecting that a client device (e.g., $Client_A$ 240) has been disassociated with $AP_A$ 230. This is because the client device may have roamed to a different AP (e.g., $AP_B$ 235) that is managed by a different network controller (e.g., $Controller_B$ 215), but remains on the same VLAN (e.g., $VLAN_1$ 250). If so, the client device will need to maintain the same IP address after it roams to the new AP. However, if the client device is on a different VLAN (e.g., $VLAN_2$ 255), then $Controller_A$ 210 will be able to release the IP address on behalf of the client device. Therefore, it is important for the network controllers to communicate with each other and share the pertinent client information in order to determine whether it is appropriate to release an IP address assigned to a client device that has been disconnected from or detected to be inactive on the network.

Specifically, each network controller maintains a user entry when a client device initially connects to the network. The user entry may include, for example, the client device's Media Access Control (MAC) address, the client device's IP address, a timeout value, a VLAN identifier, a link to another table such as a station table, etc. The user entry will remain active as long as the client device is actively transmitting or receiving traffic on the network. However, if a client device becomes inactive or disconnects from the network, the user entry will be removed after a predetermined period of time. In some embodiments, when a client device (e.g., $Client_A$ 240) disassociates with a network, the client device (e.g., $Client_A$ 240) transmits a disassociation request to the AP (e.g., $AP_A$ 230). Based on such management frames (e.g., disassociation request) sent by the client device (e.g., $Client_A$ 240), the network controller (e.g., $Controller_A$ 210) can remove the corresponding user entry. In addition to user entries, each network controller (e.g., $Controller_A$ 210 or $Controller_B$ 215) and/or AP ($AP_A$ 230 or $AP_B$ 235) can also keep track of the IP address of the DHCP servers. Moreover, the network controllers (e.g., $Controller_A$ 210 and $Controller_B$ 215) can share the user entries and DHCP server information among each other. Thus, the network controllers can detect whether and when a particular client device has moved from one VLAN to a different VLAN based on user entry changes. Hence, the network controller can take actions to optimally balancing the DHCP load upon detecting such client device moves.

In the example illustrated in FIG. 2, when $Client_A$ 240, . . . , $Client_N$ 249 move from disassociate with $AP_A$ 230 and associate with $AP_B$ 235. $Controller_B$ 215, determines that client devices belong to a new VLAN, e.g., $VLAN_2$ 255, after roaming to the new $AP_B$ 235. Therefore, each client device will be assigned a new IP address corresponding to $VLAN_2$ 255 by DHCP server 265. Meanwhile, $Controller_A$ 210 detects that $Client_A$ 240, . . . , $Client_N$ 249 have disassociated with $AP_A$ 230. Therefore, $Controller_A$ 210 will send a query to other network controllers (e.g., $Controller_B$ 215) in the network to determine whether the client devices are still associated with the network. In response, $Controller_B$ 265 will send a message to $Controller_A$ 260 indicating that those client devices are now associated with a different VLAN (e.g., $VLAN_2$ 255 and not $VLAN_1$ 250). Upon receiving the response from $Controller_B$ 215, $Controller_A$ 210 can initiate an artificial DHCP release message to DHCP server 260 in order to release, on behalf of the client devices, the IP addresses corresponding to $VLAN_1$ 250.

In some embodiments, all network controllers in a WLAN are registered in a domain group. Whenever a new client device joins the WLAN, the network controller managing the AP with which the new client device associates will update the rest of the domain group. Likewise, when an existing client device leaves the WLAN, the network controller also updates the domain group in the same manner. Specifically, the network controller will update the client-specific information, including but not limited to, the MAC address of the client device, the IP address of the client device, the VLAN identifier corresponding to the VLAN that the client device is assigned to, etc.

In some embodiments, a multicast address is associated with the domain group. Thus, a first network controller may send a multicast message to notify all other network controllers in the domain group. If any of the other network controller detects the client device based on the MAC and/or IP address of the client device, the network controller will respond to the multicast message indicating that the inquired client device exists in the network. Otherwise, the other network controllers will not respond to the multicast message. The first network controller can then determine whether to initiate the DHCP release based on whether and what the response is received.

Detection of Inactivity of Client Devices

There are a number of ways that a network controller can detect that a client device is not active in the network, and therefore initiate a DHCP release on behalf of the client device to DHCP server. For example, first, a client device may send a de-association message to the AP. When a network controller detects that such a de-association message has been sent from the client device, the network controller can determine that the client device is no longer associated with the network.

Second, if a client device has not transmitted any data for a predetermined period of time, the network device will detect that the corresponding user has timed out. The user entry is kept "alive" as long as the client device is transmitting data on the network. Thus, when the network controller receives a subsequent data packet from the client device, the user entry time out value will be reset. A default user time out value, e.g., 5 minutes, can be configured by the network controller. If, however, there is no traffic from the user for the configured time out value, then the network controller will mark the user as inactive and purge the user entry corresponding to the client device. Prior to removing the user entry, the network controller will retrieve the IP address of the client device and other client information from the user entry, such that the network controller can transmit a DHCP release message on behalf of the client device.

Third, a network controller can poll an idle client device, for example, by sending an Address Resolution Protocol (ARP) request. If a response is not received from the client device, the network controller can presume that the client device is no longer associated with the network.

Fourth, a network controller may detect that a client device has joined a new VLAN (e.g., $VLAN_2$) from an old VLAN (e.g., $VLAN_1$). Therefore, the network device can presume that the client device is no longer active on the old VLAN and release the IP address corresponding to the old VLAN that was previously assigned to the client device. Note that, this is applicable when both the old VLAN and the new VLAN are managed by the same network controller.

DHCP Release on Behalf of Client Device

According to embodiments of the present disclosure, in a network with a single network controller, whenever the network controller detects that a client device is no longer active in the network, the network controller will perform an artificial DHCP release, on behalf of the client device, to release the IP address previously assigned to the client device. If multiple network controllers exist in the network, the network controller detecting the inactivity of the client device will send a query to other network controllers in the network. If any other network controllers respond that the client device is active the network, the network controller will not initiate the artificial DHCP release process. If, however, the network controller does not receive, within a reasonable period of time, any response from other network controllers indicating that the client device is active, then the network controller can initiate the artificial DHCP release process.

In addition, a network controller can snoop network packet exchanges between the client device and the DHCP server, thereby determining that an IP address has been assigned to the client device by the DHCP server, but the IP address has not been released by the client device when the client device is no longer connected to the network. In some embodiments, the network controller may keep track of the IP addresses assigned to each client device and the identifier of the DHCP server assigning each IP address. In some embodiments, the network controller may further keep track of the lease time associated with each IP address assignment. Therefore, the network controller and/or AP can generate a DHCP release message on behalf of the client device. The DHCP release message may identify the IP address assigned to the client device as the source IP address, even though the DHCP release message is generated by the network controller and/or AP.

Figure 3:
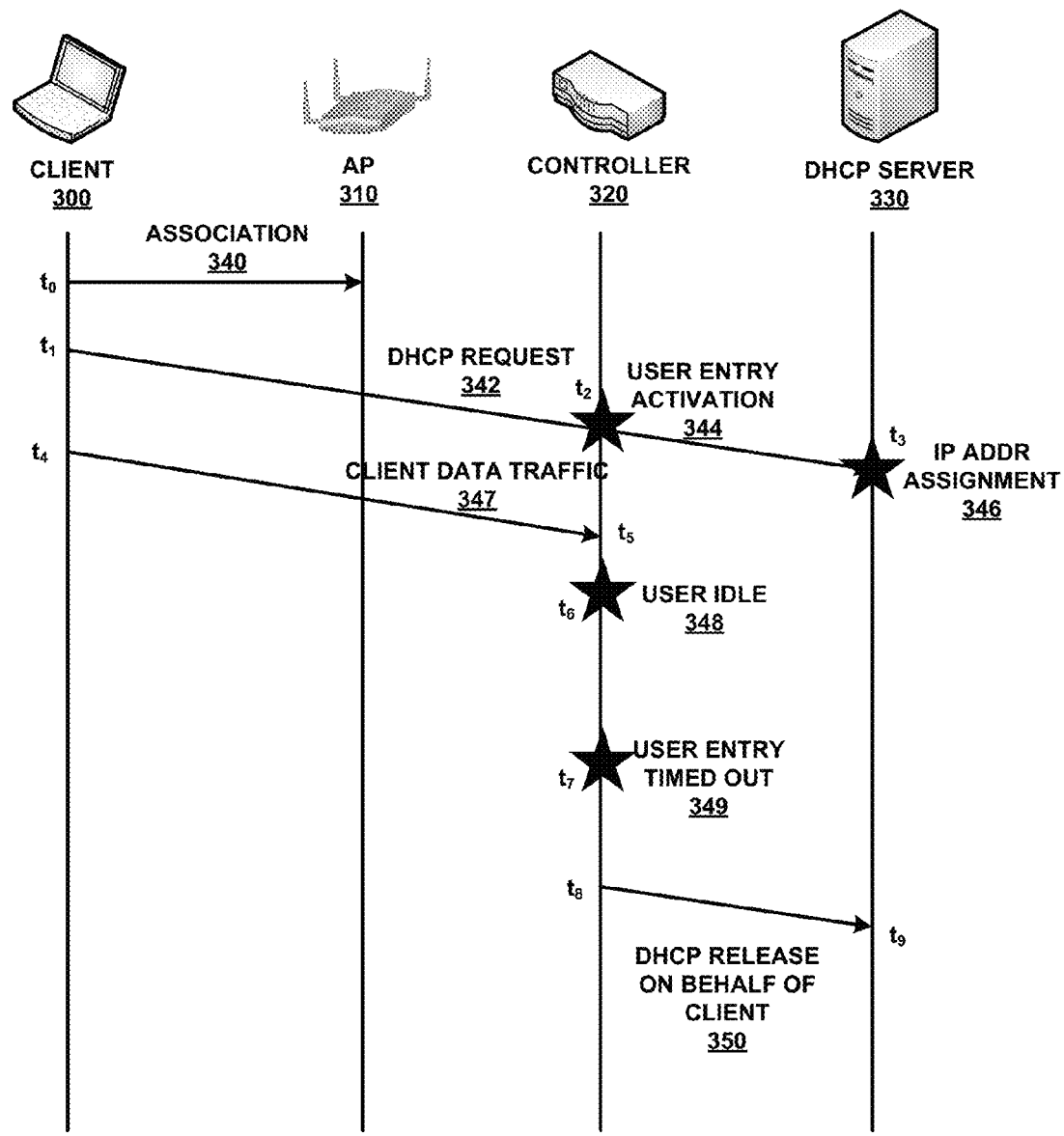
FIG. 3 shows an exemplary sequence diagram illustrating communication exchanges for controlling DHCP pool exhaustion according to embodiments of the present disclosure.

FIG. 3 shows an exemplary sequence diagram illustrating communication exchanges for controlling DHCP pool exhaustion according to embodiments of the present disclosure. Specifically, FIG. 3 includes at least a client device 300, an AP 310, a network controller 320, and a DHCP server 330. At time point $t_0$, client device 300 transmits an association request 400 to AP 310, and connects to the WLAN. Subsequently, at time point $t_1$, client device 300 transmits a DHCP request 342 to DHCP server 330 in order to be assigned with a valid IP address. DHCP request 342 is forwarded by a number of network devices in the WLAN, such as AP 310 and network controller 320. At time point $t_2$, when network controller 320 receives DHCP request 342, network controller 320 can snoop the packet and determine that the packet is originated from client device 300. Then, network controller 320 can activate a user entry corresponding to client device 300 (i.e., user entry activation 344). At time point $t_3$, DHCP server 330 receives DHCP request 342 from client device 300, and assigns an IP address for client device 300 (i.e., IP address assignment 346). Thereafter, client device 300 can use the assigned IP address to transmit client data traffic 347 on the WLAN. For example, at time point $t_4$, client device 300 sends data traffic 347, which are received by network controller 320 at time point $t_5$.

On the other hand, when network controller 320 activates the user entry through user entry activation 344, network controller 320 will start a timer with a predetermined period of time. At time point $t_5$, when network controller 320 receives a data packet from client device 300, network controller 320 will reset the timer to the predetermined period of time. Assuming that, at time point $t_6$, client device 300 becomes inactive (i.e., user idle 348) and remains inactive until at least time point $t_7$. At time point $t_7$, the user entry is timed out 349. Therefore, network controller 320 will detect the inactivity of client device 300 due to user entry being timed out 349.

When the network has only one controller, network controller 320 will transmit a DHCP release 350 on behalf of client device 300 to DHCP server 330. If the network has more than one network controllers, network controller 320 will share the information with other network controllers as described in the previous section. If none of the other network controllers detects the client device 300, network controller 320 will then transmit a DHCP release 350 on behalf of client device 300 to DHCP server 330. DHCP release 350 is a unicast message with the IP address of client device 300 as the source IP address, and the IP address of DHCP server 330 as the destination IP address. Note that, network controller 320 can determine the IP address of client device 300 and the IP address of DHCP server 330 by snooping previous DHCP communication exchanges (e.g., DHCP request 342) between client device 300 and DHCP server 330. To snoop a packet exchange, network controller 320 can perform a packet inspect to determine whether a particular packet is a DHCP message; and if so, network controller 320 can retrieve the client and DHCP information from the header of the received packet before forwarding the packet to its destination address.

Process for Controlling DHCP Pool Exhaustion in Dynamic Network Environments

Figure 4:
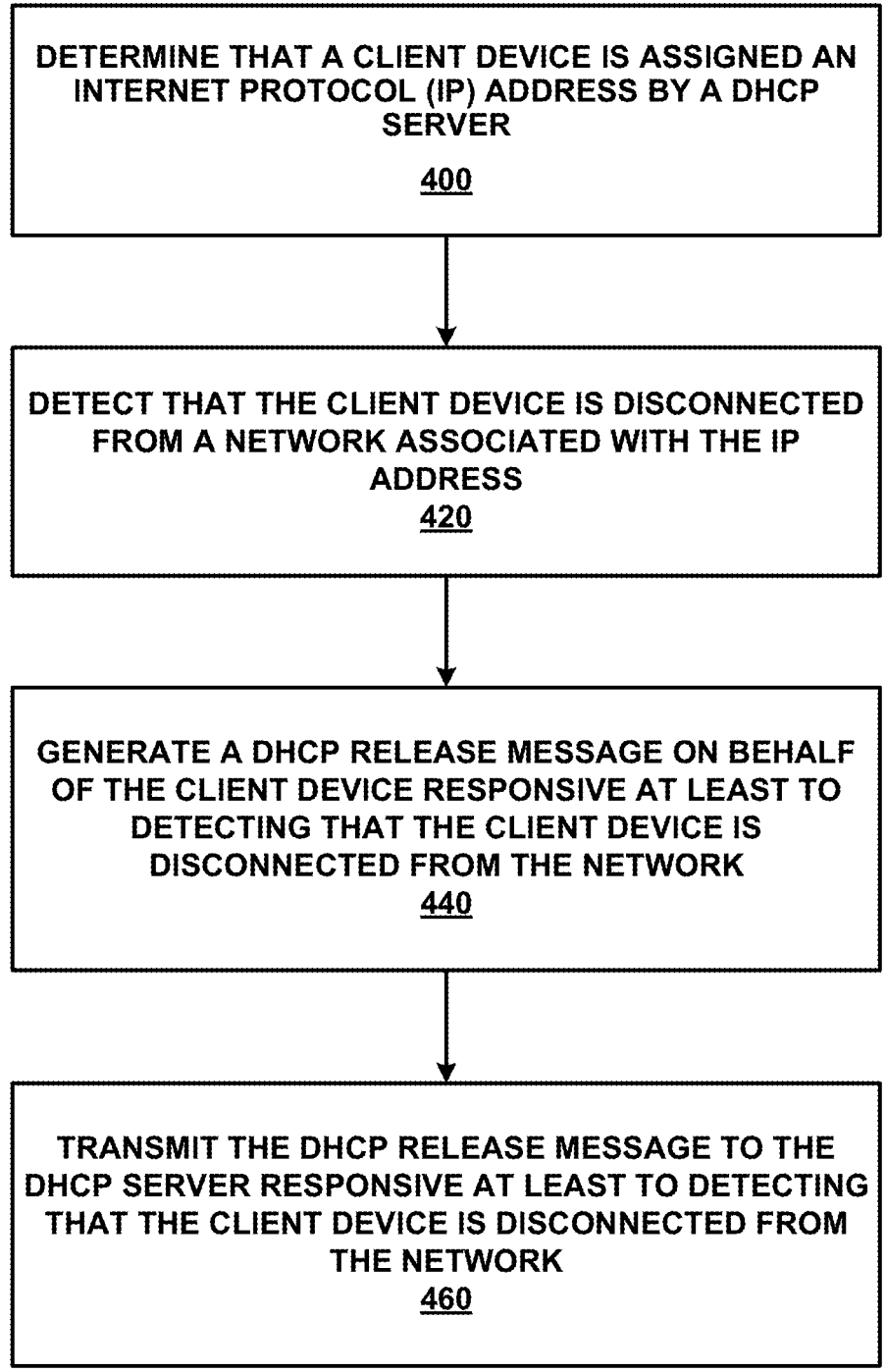
FIG. 4 shows an exemplary process for controlling DHCP pool exhaustion in dynamic network environments according to embodiments of the present disclosure.

FIG. 4 illustrates an exemplary process for controlling DHCP pool exhaustion in dynamic network according to embodiments of the present disclosure. During operations, a network device determines that a client device is assigned an Internet Protocol (IP) address by a DHCP server (operation 400). The network device may detect that the client device is disconnected from a network associated with the IP address (operation 420). Responsive at least to detecting that the client device is disconnected from the network, the network device generates a DHCP release message on behalf of the client device (operation 440). Then, the network device transmits the DHCP release message to the DHCP server (operation 460).

In some embodiments, the network device determines that the client device is assigned the IP address by the DHCP server by snooping at least one message between the DHCP server and the client device.

In some embodiments, the network device detects that the client device is disconnected from the network by determining that no network device in a VLAN, associated with the IP address assigned to the client device, detects a connection of the client device with the network. In some embodiments, the network device detects that the client device is disconnected from the network by receiving a de-association message from the client device. In some embodiments, the network device detects that the client device is disconnected from the network by determining that a session or an entry corresponding to the client device has timed out. In some embodiments, the network device detects that the client device is disconnected from the network by determining that the client device has failed to respond to one or more messages transmitted to the client device. In some embodiments, the network device detects that the client device is disconnected from said network by determining that the client device has connected to another network different than said network.

In some embodiments, the network device generates the DHCP release message on behalf of the client device, whereas the DHCP release message identifies a source of the DHCP release message as the client device. In some embodiments, the network device generates the DHCP release message in response to determining that a DHCP lease associated with the IP address has not expired. In some embodiments, the network device generates the DHCP release message in response to determining that a DHCP release message has not been transmitted by the client device.

System for Controlling DHCP Pool Exhaustion in Dynamic Network Environments

Figure 5:
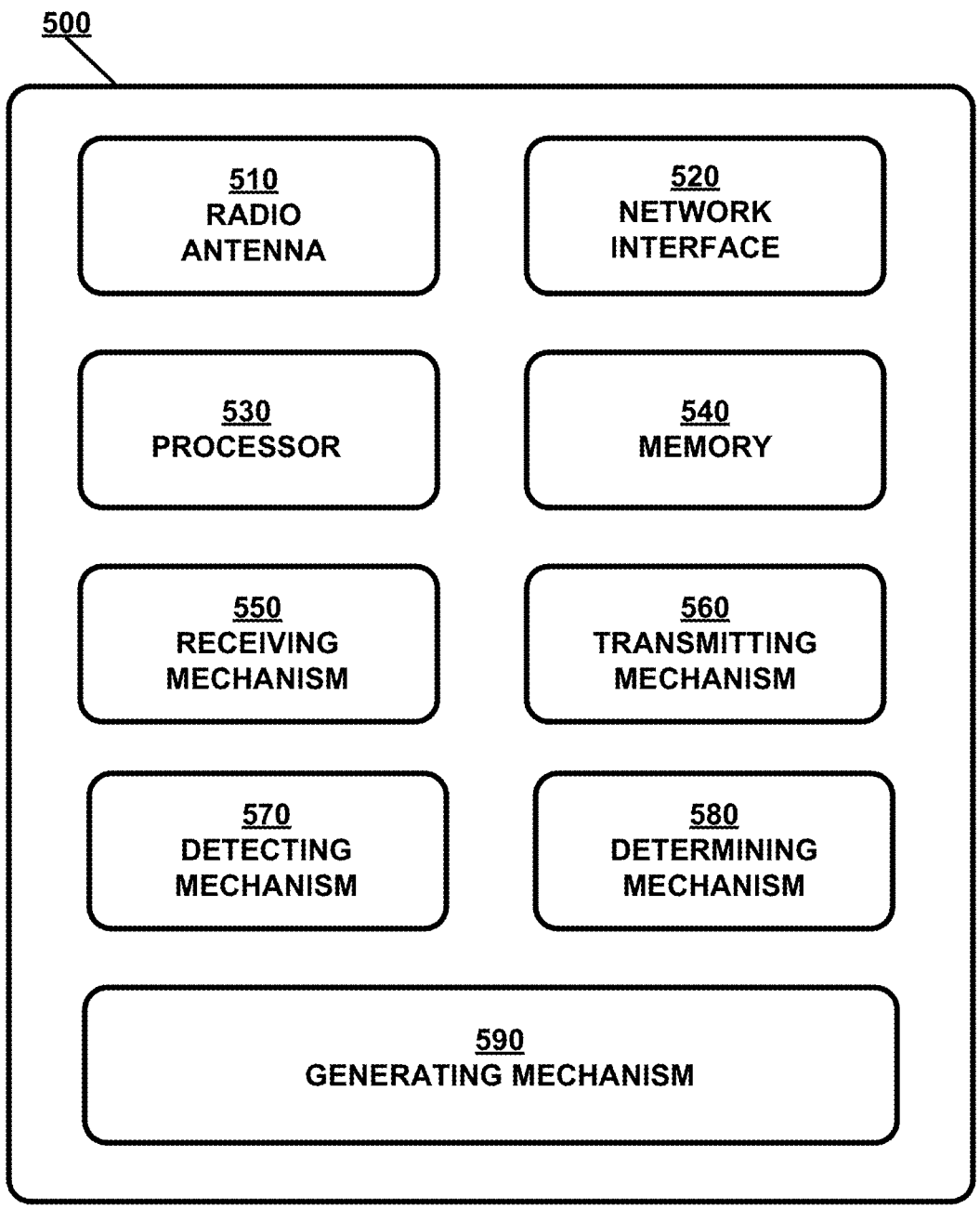
FIG. 5 is a block diagram illustrating an exemplary system for controlling DHCP pool exhaustion in dynamic network environments according to embodiments of the present disclosure.

FIG. 5 is a block diagram illustrating a system for controlling DHCP pool exhaustion in dynamic network according to embodiments of the present disclosure. Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes a receiving mechanism 550, a transmitting mechanism 560, a detecting mechanism 570, a determining mechanism 580, and a generating mechanism 590, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as, Dynamic Random Access Memory (DRAM), Static Random Access Memory (SRAM), etc.

Receiving mechanism 550 generally receives one or more network messages via network interface 520 or radio antenna 510 from a wireless client. The received network messages may include, but are not limited to, requests and/or responses, beacon frames, management frames, control path frames, and so on.

Transmitting mechanism 560 generally transmits messages, which include, but are not limited to, requests and/or responses, beacon frames, management frames, control path frames, and so on. Specifically, transmitting mechanism 560 can transmit a DHCP release message to the DHCP server on behalf of a client device.

Detecting mechanism 570 generally detects that a client device is disconnected from a network associated with an IP address. Specifically, detecting mechanism 570 can detect that the client device is disconnected from the network if determining mechanism 580 determines a particular event. In some embodiments, detecting mechanism 570 can detect that the client device is disconnected from the network if receiving mechanism 550 receives a de-association message from the client device.

Determining mechanism 580 generally occurrence of certain events such that detecting mechanism 570 can detect that the client device is disconnected from the network. Specifically, in some embodiments, determining mechanism 580 determines that no network device in a Virtual Local Area Network (VLAN), associated with the IP address assigned to the client device, detects a connection of the client device with the network. In some embodiments, determining mechanism 580 determines that a session or an entry corresponding to the client device has timed out. In some embodiments, determining mechanism 580 determines that the client device has failed to respond to one or more messages transmitted to the client device. In some embodiments, determining mechanism 580 determines that the client device has connected to another network different than said network.

In addition, determining mechanism 580 can determine that a client device is assigned an Internet Protocol (IP) address by a DHCP server. Specifically, determining mechanism 580 can do so by snooping at least one message between the DHCP server and the client device.

Generating mechanism 590 generally generates a DHCP release message on behalf of the client device. Specifically, generating mechanism 590 can identify a source of the DHCP release message as the client device. In some embodiments, generating mechanism 590 generates the DHCP release message in response to determining mechanism 580 determining that a DHCP lease associated with the IP address has not expired. In some embodiments, generating mechanism 590 generates the DHCP release message further in response to determining mechanism 580 determining that a DHCP release message has not been transmitted by the client device.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium storing instructions executable by a hardware processor to:
    determine that a client device is assigned an Internet Protocol (IP) address by a Dynamic Host Configuration Protocol (DHCP) server;
    share user entries and DHCP server information among a plurality of network controllers that are in a Virtual Local Area Network (VLAN);
    detect that the client device is disconnected from a first network controller among the plurality of network controllers, based in part on the shared user entries, DHCP server information, and a determination that none of the plurality of network controllers detects a connection with the client device, wherein the first network controller is associated with the IP address; and
    responsive to the detection that the client device is disconnected from the first network controller:
        generate a DHCP release message on behalf of the client device; and
        transmit the DHCP release message to the DHCP server.

2. The medium of claim 1, wherein the instructions to determine that the client device is assigned the IP address by the DHCP server comprise instructions executable by the processor to snoop a message between the DHCP server and the client device.

3. The medium of claim 1, wherein the instructions to detect that the client device is disconnected from the first network controller comprise instructions executable by the processor to receive a de-association message from the client device.

4. The medium of claim 1, wherein the instructions to detect that the client device is disconnected from the first network controller comprise instructions executable by the processor to determine that a session or an entry corresponding to the client device has timed out.

5. The medium of claim 1, wherein the instructions to detect that the client device is disconnected from the first network controller comprise instructions executable by the processor to determine that the client device has failed to respond to one or more messages transmitted to the client device.

6. The medium of claim 1, wherein the instructions to detect that the client device is disconnected from the first network controller comprise instructions executable by the processor to determine that the client device has connected to a second network controller among the plurality of network controllers.

7. The medium of claim 1, wherein the instructions to generate generating the DHCP release message on behalf of the client device comprise instructions executable by the processor to identify a source of the DHCP release message as the client device.

8. The medium of claim 1, wherein the instructions to perform the generate and transmit operations are further responsive to a determination that a DHCP lease associated with the IP address has not expired.

9. The medium of claim 1, wherein the instructions to perform the generate and transmit operations are further responsive to a determination that a DHCP release message has not been transmitted by the client device.

10. The medium of claim 1, wherein the instructions to detect that the client device is disconnected from the first network controller comprise instructions executable by the processor to:
   send an address resolution protocol request to the client device; and
   determine the client device is no longer associated with the first network controller when a response is not received from the client device in receipt of the address resolution protocol request.

11. A network device, comprising:
   a hardware processor to execute instructions to:
      determine that a client device is assigned an Internet Protocol (IP) address by a Dynamic Host Configuration Protocol (DHCP) server;
      share user entries and DHCP server information among a plurality of network controllers that are in a Virtual Local Area Network (VLAN);
      detect that the client device is disconnected from a first network controller among the plurality of network controllers, based in part on the shared user entries, DHCP server information, and a determination that none of the plurality of network controllers detects a connection with the client device, wherein the first network controller is associated with the IP address; and
      responsive to the detection that the client device is disconnected from the first network controller:
         generate a DHCP release message on behalf of the client device; and
         generate the DHCP release message to the DHCP server.

12. The network device of claim 11, wherein the instructions to determine that the client device is assigned the IP address by the DHCP server comprise instructions executable by the processor to snoop a message between the DHCP server and the client device.

13. The network device of claim 11, wherein the instructions to detect that the client device is disconnected from the first network controller comprise instructions executable by the processor to receive a de-association message from the client device.

14. The network device of claim 11, wherein the instructions to detect that the client device is disconnected from the first network controller comprise instructions executable by the processor to determine that a session or an entry corresponding to the client device has timed out.

15. The network device of claim 11, wherein the instructions to detect that the client device is disconnected from the first network controller comprise instructions executable by the processor to determine that the client device has failed to respond to one or more messages transmitted to the client device.

16. The network device of claim 11, wherein the instructions to detect that the client device is disconnected from the first network controller comprise instructions executable by the processor to determine that the client device has connected to a second network controller among the plurality of network controllers.

17. The network device of claim 11, wherein the instructions to generate the DHCP release message on behalf of the client device comprise instructions executable by the processor to identify a source of the DHCP release message as the client device.

18. The network device of claim 11, wherein the instructions to perform the generate and transmit operations are further responsive to a determination that a DHCP lease associated with the IP address has not expired.

19. The network device of claim 11, wherein the instructions to perform the generate and transmit operations are further responsive to a determination that a DHCP release message has not been transmitted by the client device.

* * * * *